US005615482A

United States Patent [19]

Morando

[11] Patent Number: 5,615,482

[45] Date of Patent: Apr. 1, 1997

[54] METHOD FOR MAKING COMPOSITE CENTRIFUGALLY CAST FURNACE ROLL RINGS FOR FURNACE ROLLS

[75] Inventor: Jorge A. Morando, Grosse Ile, Mich.

[73] Assignee: Alphatech, Inc., Trenton, Mich.

[21] Appl. No.: 383,578

[22] Filed: Feb. 3, 1995

Related U.S. Application Data

[63] Continuation-in-part of Ser. No. 287,647, Aug. 9, 1994, abandoned.

[51] Int. Cl.[6] .......... B23P 15/00

[52] U.S. Cl. .......... 29/895.21; 29/895.32; 492/36

[58] Field of Search .......... 29/895.21, 895.23, 29/895.22, 895.3, 895.32; 164/23, 24, 47, 460, 75

[56] References Cited

U.S. PATENT DOCUMENTS

| | | | |
|---|---|---|---|
| 4,094,707 | 6/1978 | Schrewe et al. | 29/895.32 |
| 5,167,067 | 12/1992 | Sundstedt et al. | 29/895.21 |
| 5,338,280 | 8/1994 | Morando | 492/36 |
| 5,341,568 | 8/1994 | Bricmont et al. | 29/895.21 |
| 5,359,772 | 11/1994 | Carlsson et al. | 29/895.32 |

FOREIGN PATENT DOCUMENTS

| | | | |
|---|---|---|---|
| 144825 | 12/1978 | Japan | 29/895.21 |
| 7115915 | 7/1982 | Japan | 29/895.32 |
| 8055550 | 4/1983 | Japan | 29/895.32 |

*Primary Examiner*—Irene Cuda
*Attorney, Agent, or Firm*—Charles W. Chandler

[57] ABSTRACT

A method for making either a ringless annealing furnace roll or a furnace roll having a series of spaced rings for supporting a metal strip being removed from an annealing furnace. Each ring is centrifugally cast with an outer rim of a steel alloy that is relatively insoluble with respect to the alloy of the strip being transferred from the furnace, and an inner liner of an alloy that can be readily welded to a roll. The inner liner material is fused to the rim material to form a composite ring.

9 Claims, 3 Drawing Sheets

METHOD FOR MAKING COMPOSITE CENTRIFUGALLY CAST FURNACE ROLL RINGS FOR FURNACE ROLLS

CROSS-REFERENCE TO RELATED APPLICATIONS

This application is a continuation-in-part of application Ser. No. 08/287,647, filed Aug. 9, 1994, for "Heat Treating Annealing and Tunnel Furnace Rolls", now abandoned.

BACKGROUND OF THE INVENTION

This invention is related to rings for furnace rolls and to a ringless furnace roll, and more particularly to a composite roll, and a composite ring each having a rim that is centrifugally cast of a material that is relatively insoluble with respect to the steel strip being transferred from the furnace, and an inner liner of a material having different solubility characteristics than the rim. The liner and the rim are centrifugally cast to fuse the liner to the rim.

In my U.S. Pat. No. 5,338,280, issued Aug. 16, 1994, for "Annealing and Tunnel Furnace Rolls", I disclosed a novel furnace roll for transferring a heated strip of a steel alloy from an annealing furnace. The roll employs a series of spaced rings that are welded to a tubular body. The rings are formed of a steel alloy selected so as to be relatively non-weldable with respect to the steel alloy of the heated strip as a consequence of the high covalent bonded alloy particles concentration. The reason is to reduce the usual pick-up or material transfer between the roll and the strip caused by the tendency of the strip material to adhere to the rings at high temperatures, thus reducing the life of the rings and the quality of the strip.

However, a ring material that is relatively insoluble with the strip material is usually difficult to weld to the furnace roll body because of its' high adhesion and solubility resistance.

SUMMARY OF THE INVENTION

The broad purpose of the present invention is to provide a furnace roll having a composite ring formed of two steel alloys. The ring has a rim material of a steel alloy selected having a very low surface energy, high hardness and relative insolubility (high ratio of covalent bonded particles) with the steel strip being transferred. The ring has an inner liner of a second alloy that can be readily welded to the roll. The ring is formed in a centrifugal casting process in which the rim alloy is first cast to form a tubular structure. A liner of a second steel alloy is then centrifugally cast on the inside of the tubular structure while it is still sufficiently hot the two materials fuse together, forming an integral composite tube. The tube is removed from the casting apparatus and sliced into a series of rings which may be readily individually welded onto the furnace roll.

A further object is to provide a furnace roll formed of two tubular structures fused together, the outer structure being relatively insoluble with the strip material. The composite ringless roll is formed in a similar procedure except the tubular structure is not sliced into rings.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like reference parts throughout the several views, and in which.

DESCRIPTION OF THE PREFERRED EMBODIMENT

Figure 1:
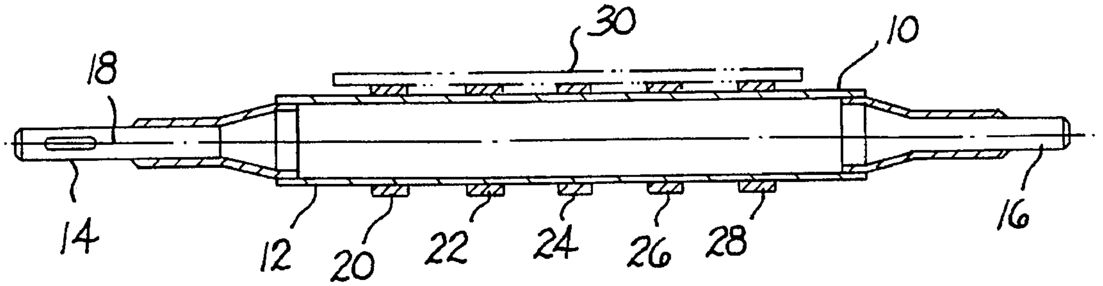
FIG. 1 is a longitudinal sectional view of a furnace roll illustrating the preferred embodiment of the invention with a steel strip being illustrated in phantom.

Referring to the drawings, FIG. 1 illustrates a preferred annealing furnace roll 10 illustrating the invention. The roll is illustrated in section to show a tubular body 12 having a pair of shaft ends 14 and 16 adapted to support the roll for rotation about axis 18. In use, the roll has its shaft ends mounted in a pair of bearings, not shown. The roll body, for illustrative purposes, supports five wear rings 20, 22, 24, 26, and 28, which are spaced at regular intervals along the length of the roll. The five rings are preferably welded to the roll, however, they could be connected by other suitable means so that they can be replaced without having to replace the entire roll assembly. The outer rims of the rings typically support a generally flat, hot steel strip 30 which is transferred along a series of rolls from an annealing furnace under relatively high temperature conditions, as is well known to those skilled in the art.

For illustrative purposes, strip 30 is a stainless steel (400 or 300 series) alloy steel.

Tubular body 12 is formed of a Nicrom 72 steel selected because of its strength at high operating temperatures. Nicrom 72 steel is available from ALPHATECH, Inc. of Fraser, Mich.

The wear rings are identical. Each wear ring has a 12" outside diameter and a width of 1 ¾". A distance of about 10" separates adjacent rings.

Figure 4:
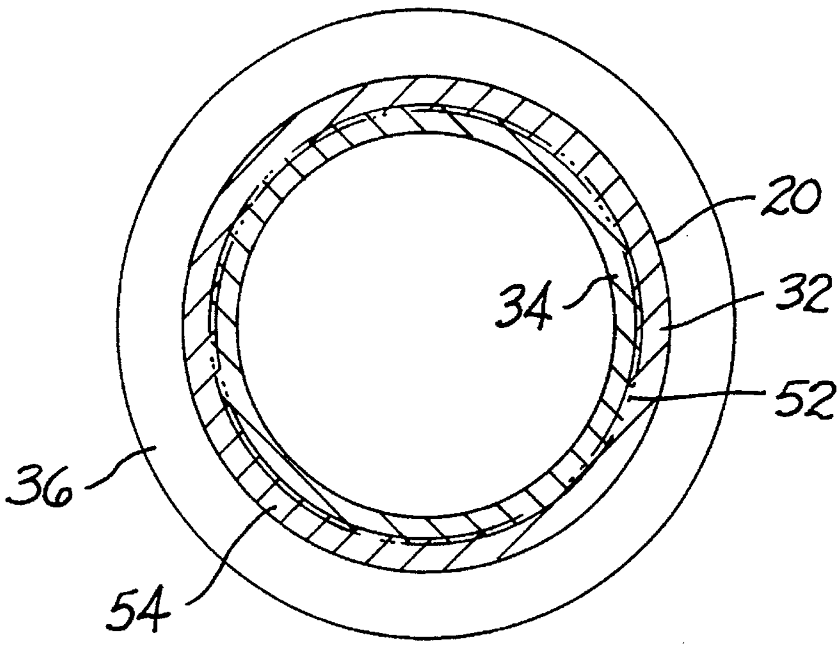
FIG. 4 is an enlarged cross-section view of the mold and the composite tubular structure.

FIG. 4 illustrates a typical ring 20. Ring 20 has an outer rim 32 formed of a steel alloy relatively insoluble with the material of the steel strip. For the particular alloy of strip 30, the rim material may be "Nicrom 8" which has a very low surface energy, and is very hard and relatively insoluble with respect to the strip material, because of this adhesion resistance, Nicrom 8 also has poor weldability with respect to the alloy of roll body 12. For this reason, ring 20 has an inner liner 34 formed of a material chosen to have: a) good welding characteristics with respect to the roll material; b) the same or nearly the same coefficient of expansion. That is, it can be readily welded to form an integral structure. For illustrative purposes, liner 34 is formed of Nicrom 72, also ALPHATECH made.

Figure 2:
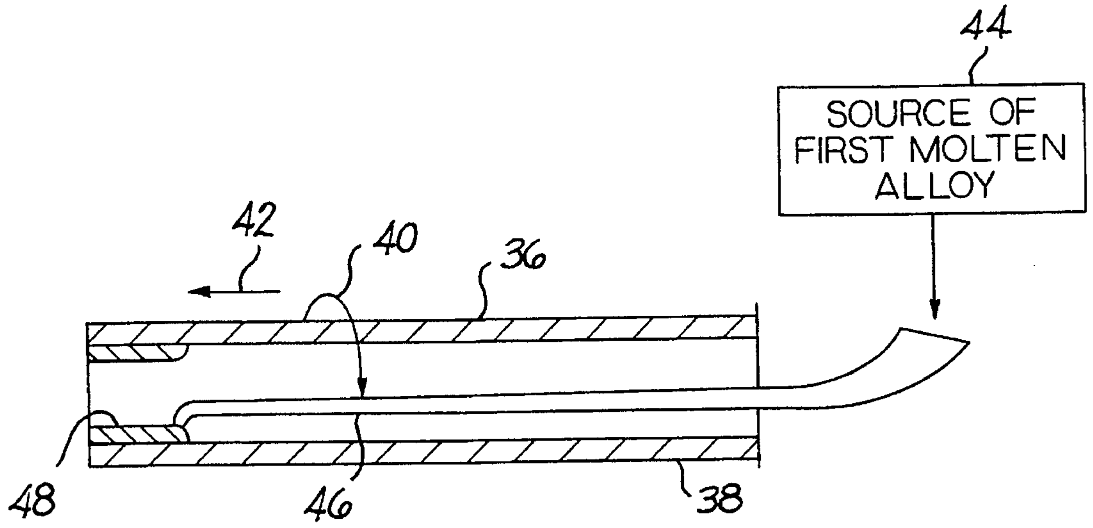
FIG. 2 is a schematic view of a centrifugal casting process illustrating the first alloy being centrifugally cast to form an outer layer.
Figure 3:
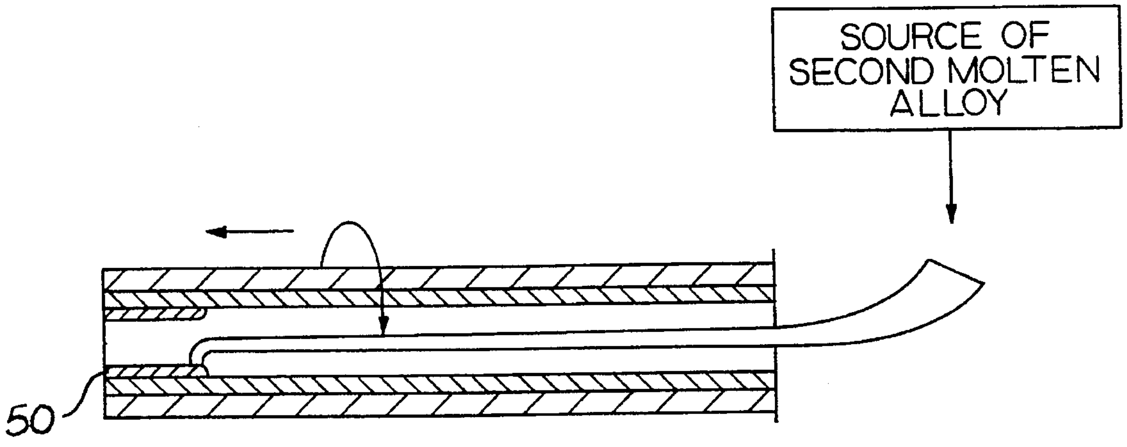
FIG. 3 is a view showing a second steel alloy being centrifugally cast on the inside of the first layer.
Figure 5:
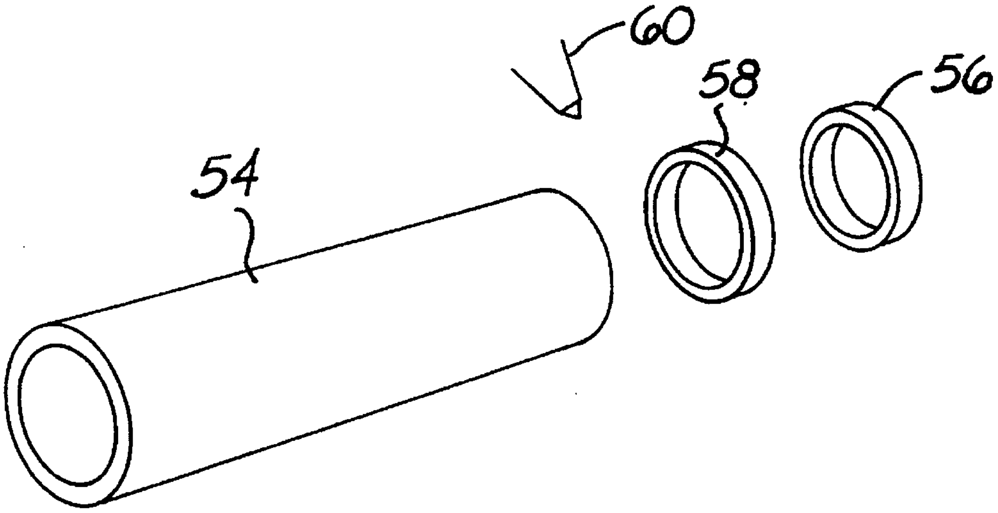
FIG. 5 is a view illustrating the composite tubular structure being cut to form a series of individual rings.

I have found that the rim material may be joined with the liner material in a fusion process by centrifugally casting the rings as illustrated in FIGS. 2, 3 and 5.

A conventional centrifugal casting apparatus is illustrated at 36 and comprises an elongated tubular mold 38 which is rotated about its longitudinal axis in the direction of arrow 40, as the mold is advanced in the direction of arrow 42, along the longitudinal axis of the mold.

Initially, a source of molten steel 44 delivers the molten rim alloy through a feed pipe 46 which delivers it to the inside surface of the mold as it is being rotated and advanced in the direction of arrow 42, forming an outer tubular layer 48 on the inside of the mold. The molten alloy may be about 2500° fahrenheit. The mold is rotated at 1000 rpm and advanced in the direction of arrow 42 at approximately one foot per second, depending on the thickness of the metal layer being deposited.

This process is continued, as illustrated in FIG. 3, until the outer layer of rim material has formed a tubular body extending the length of the mold. The molten tubular has about a ⅜" wall thickness. The temperature of the inner annular portion of the outer layer is important. While the inner face of the outer layer is still relatively hot, for example, 2000° farenheit, an inner layer 50 of the liner alloy is introduced to the inner surface of the tubular body. As the inner layer is introduced along the length of the tubular body, the two molten alloys fuse together at the interface between the two layers, joining the two layers in a tubular joint, having a total thickness of about ¾" to 1", as illustrated in FIG. 4 at 52.

It is important to introduce the inner layer into the casting process at the proper time to prevent any separation of the inner liner material and the rim material if the liner material has cooled too fast.

The composite tubular body 54 is removed from mold 36, and permitted to cool. Body 54 is then introduced into a suitable rotating apparatus and individual rings such as at 56 and 58 cut from the end of the tubular body by a carbide saw 60. The rings are then slid onto the end of roll body 12, and replaceably welded to body 12.

Thus, it is to be understood that I have described a composite wear ring for an annealing furnace roll having an outer rim material which is relatively insoluble with respect to the strip alloy. The alloy of liner 34 has good welding characteristics with respect to roll 12.

In some situations, when the distance between rolls is over 3'–4', then the steel strip tends to sag between adjacent furnace rolls. Consequently, it is desirable to provide a greater friction surface than is available using a series of rings.

Figure 6:
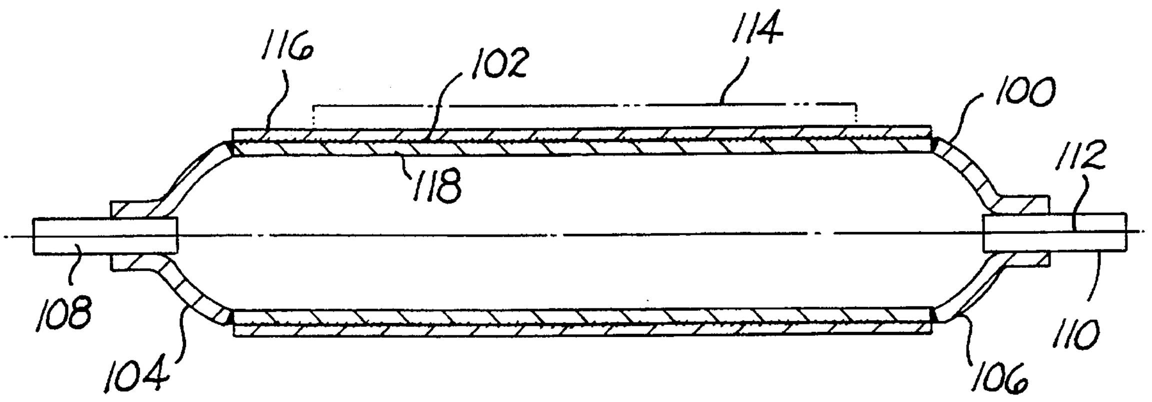
FIG. 6 is a longitudinal sectional view of a composite ringless furnace roll illustrating the invention.
Figure 7:
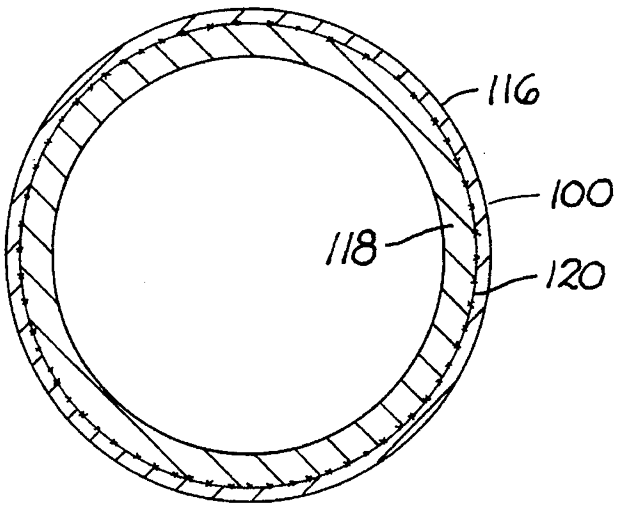
FIG. 7 is an enlarged cross-sectional view of the embodiment of FIG. 6.

FIGS. 6 and 7 illustrate a ringless roll 100 illustrating the invention. Roll 100 has a composite tubular body 102 connected by a pair of bell-shaped sections 104 and 106 to a pair of end shafts 108 and 110, respectively. The shafts are axially aligned and adapted to support the roll for rotation about axis 112. The roll supports a strip 114 having a cross-section illustrated in phantom. The strip may be of a stainless steel (400 or 300 series) alloy.

Body 102 is centrifugally cast in the same manner as described in the embodiment of FIGS. 1–3, and comprises an outer layer 116 which is centrifugally cast with a thickness normally of about ⅛" to ⅜" thick. Layer 116 is formed of an alloy relatively insoluble with the material of strip 114, that is it has a relatively low adhesion characteristic with respect to the strip. The body has an inner tubular roll section 118 having a thickness chosen to accommodate the stresses generated by the strip load, the roll geometry and the furnace operating temperature. It will normally be several times thicker than outer layer 116.

Roll section 118 is centrifugally cast inside layer 116 while the inner face of layer 116 is still sufficiently hot so that the alloy of roll 118 fuses with layer 116 along an interface generally illustrated by a series of x's in FIGS. 6 and 7 at 120. Layer 116 may be of a Nicrom 8 Steel available from ALPHATECH, Inc. of Fraser, Mich., which is relatively insoluble with respect to the strip being carried, that is the layer has a very low surface energy and is very hard. For these characteristics, roll section 118 is formed of a Nicrom 72.

Thus, roll section 118 can be readily welded, for example, to bell-shaped sections 104 and 106 after the roll has cooled from the casting process. The composite roll has an outer surface having a low adhesion characteristic with respect to the particular strip being carried, while the inner surface has sufficient strength to accommodate the strip load and can be readily welded to the balance of the roll assembly.

Further, the ringless roll has a greater frictional area for generating the necessary friction force to raise the sagging strip as it passes from roll to roll.

Having described my invention, I claim:

1. A method for making a roll for transferring a flat, heated strip of a first steel alloy from a furnace, said roll comprising an elongated tubular body having a longitudinal axis, the body being formed of a second steel alloy, a support layer carried on said tubular body forming a surface for contacting and supporting the flat heated strip on the tubular body as the tubular body is being rotated, said support layer having an outer strip-contacting surface of a third steel alloy that is relatively insoluble with respect to the first steel alloy of the heated strip; said method comprising the steps of:

centrifugally casting the support layer of said third steel alloy, and then centrifugally casting the tubular body to the support layer while the support layer is sufficiently heated to form a fused connection therebetween.

2. A method for making a ring for a roll used for transferring a flat, heated strip of a first steel alloy from an annealing furnace, the ring having an outer strip-contacting rim, the roll being formed of a second steel alloy, said method comprising the steps of selecting a third steel alloy for the outer rim of the ring that is relatively insoluble in the first steel alloy of the strip material, casting the outer ring, selecting a fourth steel alloy for the inner liner of the ring that can be welded to the roll, and then fusing the liner to the inside of the outer rim.

3. A method as defined in claim 2, in which the fusing step comprises centrifugally casting a heated rim, and then centrifugally casting a liner to the inside of the rim while the rim is sufficiently hot to form a fused alloy between the rim and the liner.

4. A method as defined in claim 2, including the step of centrifugally casting a tubular body of the third steel alloy, fusing a liner of the fourth steel alloy to the inside of the tubular body, and then dividing the fused body and liner into a plurality of rings.

5. A method for making a roll for transferring a flat, heated strip of a first steel alloy from a furnace, said roll comprising an elongated tubular body having a longitudinal axis, the body being formed of a second steel alloy, shaft means attached to opposite ends of the body for supporting the body for rotation about an axis; support structure carried on said tubular body forming a discontinuous surface for contacting and supporting the flat heated strip on the tubular body as the tubular body is being rotated; said support structure having an outer strip-contacting layer of a third steel alloy that is relatively insoluble with respect to the first steel alloy of the heated strip; and an inner layer of a fourth steel alloy that is relatively soluble with the second steel alloy of the tubular body, the inner layer being heat fused to the outer layer; said method comprising the steps of:

centrifugally casting the outer layer of said third steel alloy, and then centrifugally casting the inner layer to the outer layer while the outer layer is sufficiently heated to form a fused connection therebetween.

6. A method as defined in claim 5, in which the support structure comprises a plurality of rings connected to and spaced along the tubular body.

7. A method for making a ring for a roll used for transferring a flat, heated strip of a first steel alloy from an annealing furnace, the ring having an outer strip-contacting rim, and an inner liner, the roll being formed of a second steel alloy, said method comprising the steps of:

selecting a third steel alloy for the outer rim of the ring that is relatively insoluble in the first steel alloy of the strip material;

selecting a fourth steel alloy for the inner liner of the ring that can be welded to the roll, and then fusing the liner to the inside of the outer rim.

8. A method as defined in claim 7, in which the fusing step comprises centrifugally casting a heated rim, and then centrifugally casting a liner to the inside of the heated rim while the rim is sufficiently hot to form a fused alloy between the rim and the liner.

9. A method as defined in claim 7, including the step of centrifugally casting a tubular body of the third steel alloy, fusing a liner of the fourth steel alloy to the inside of the tubular body, and then dividing the fused body and the liner into a plurality of rings.

* * * * *